Aug. 7, 1945.  R. RODAL  2,381,312
MACHINE TOOL CONTROL APPARATUS
Filed April 26, 1943  12 Sheets-Sheet 3

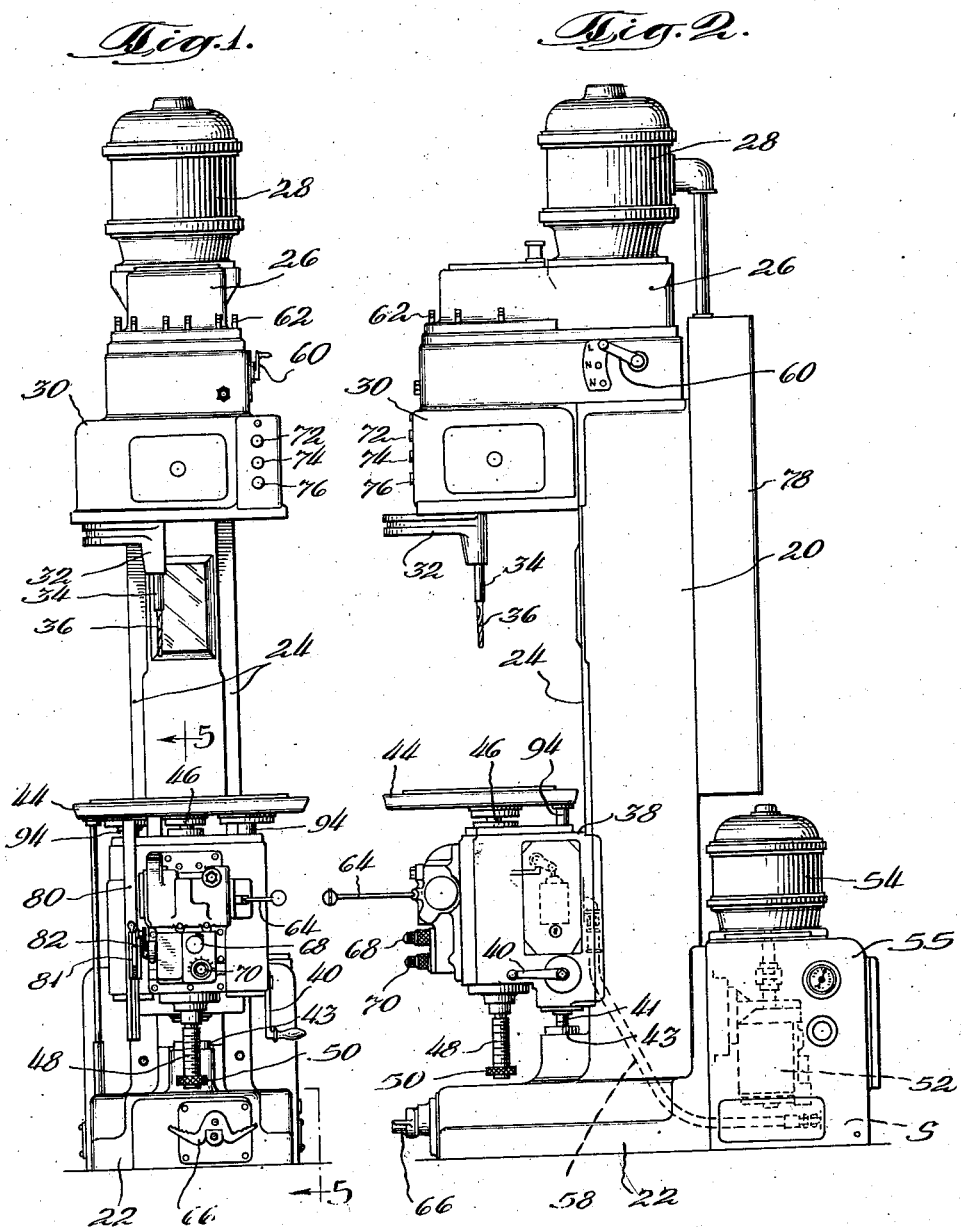

Inventor
Ralph Rodal
By Williams, Bradbury & Hinkle
Attorneys

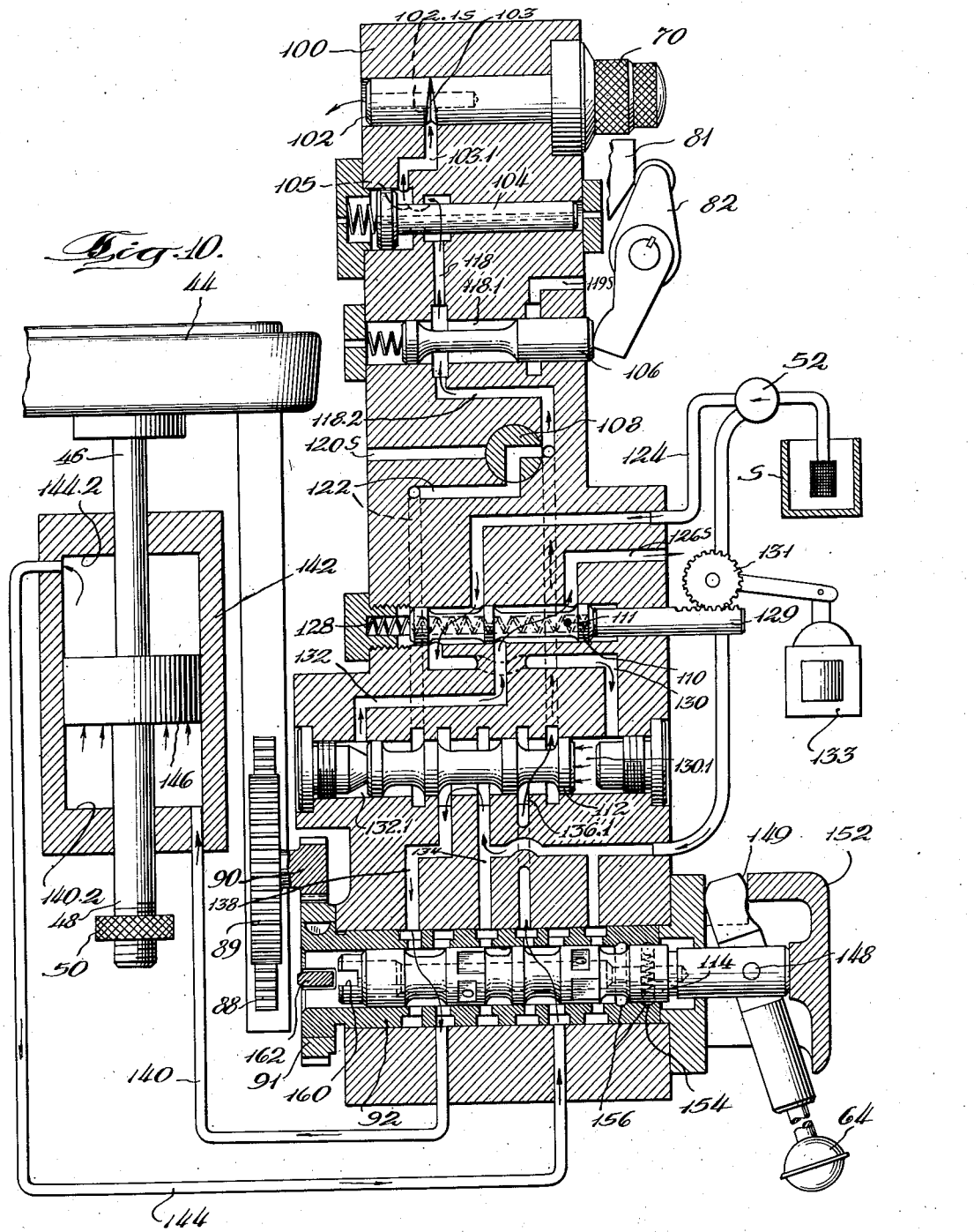

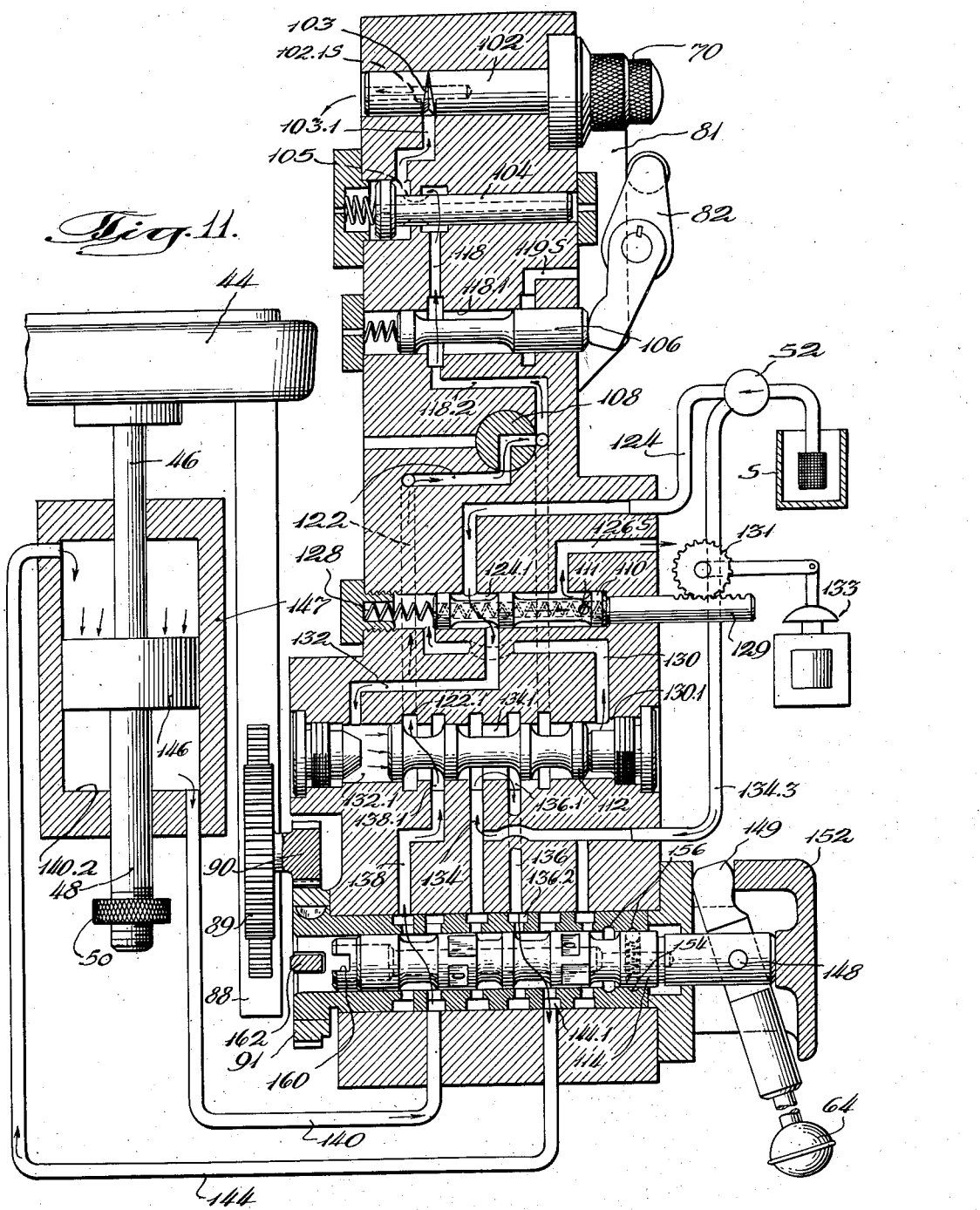

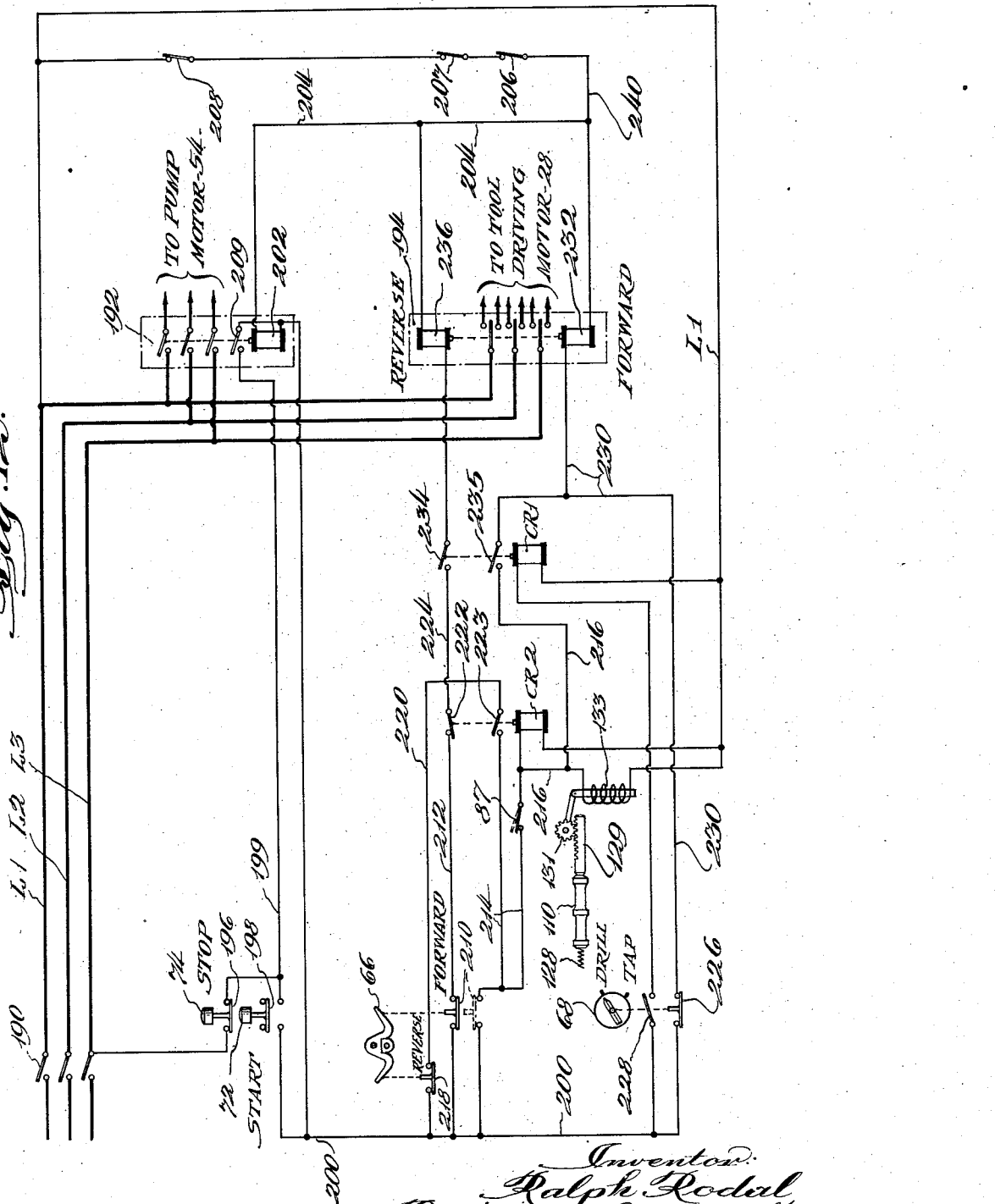

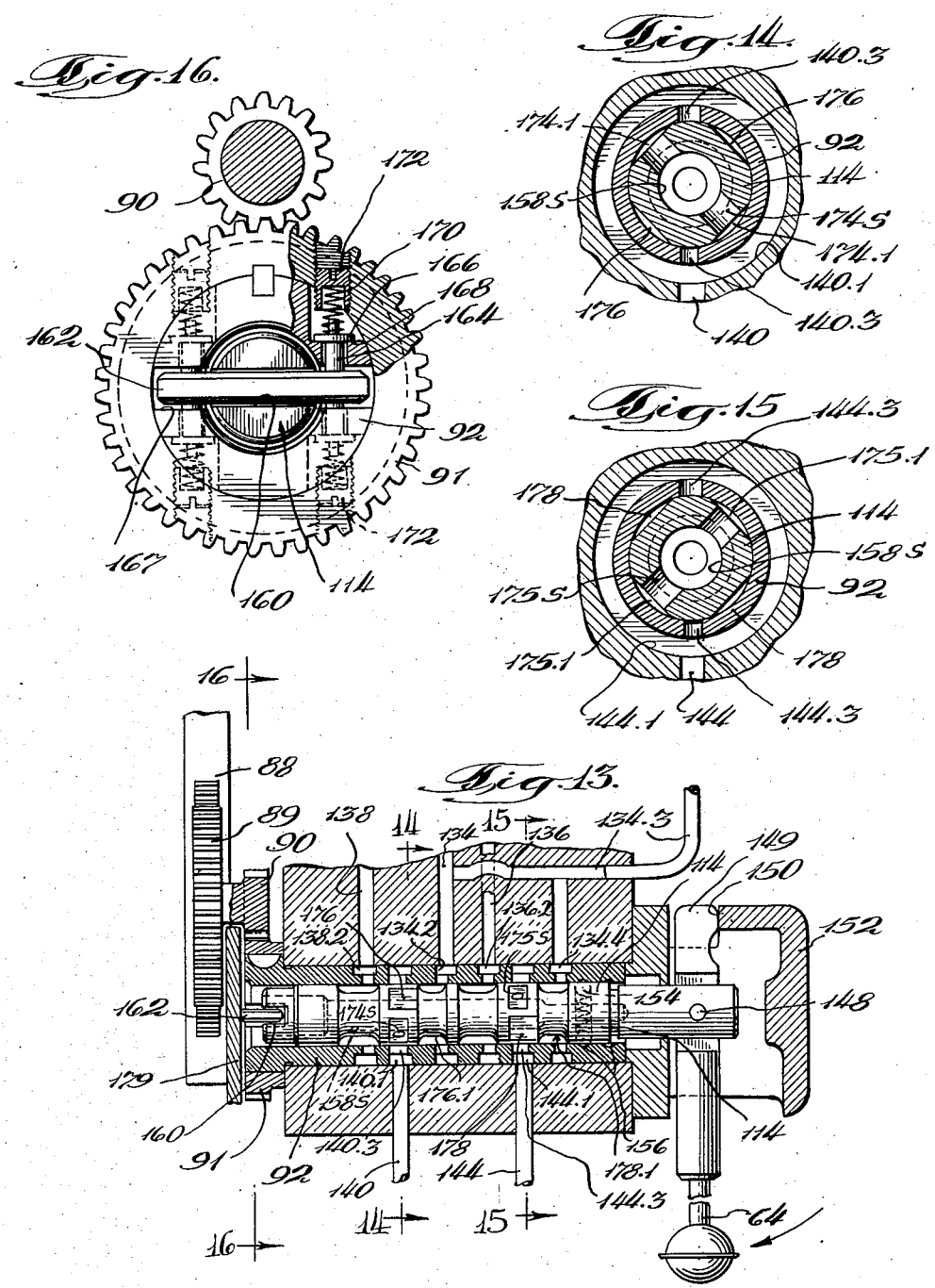

Patented Aug. 7, 1945

2,381,312

UNITED STATES PATENT OFFICE 2,381,312

MACHINE TOOL CONTROL APPARATUS

Ralph Rodal, Richmond, Ind., assignor to National Automatic Tool Company, Inc., Richmond, Ind., a corporation of Indiana Application April 26, 1943, Serial No. 484,528

10 Claims. (Cl. 121—45)

My invention relates generally to machine tool control apparatus, and more particularly to improvements in hydraulic and electrical control apparatus for drilling and tapping machines.

In the use of automatic and semi-automatic drilling and tapping machines, there are frequent occasions upon which the operator finds it desirable to control the operation of the machine manually, as, for example, during the set-up of the machine, when the machine is to perform operations upon work held in fixtures which are arranged to move the work from one position to another for the successive performance of two machine operations, such as drilling and tapping. Under other circumstances, it is desirable that the machine operation be fully automatic.

It is therefore an object of my invention to provide an improved control apparatus for machine tools in which the operation of the tool may be fully automatic, or may be manually controlled by the operator.

A further object is to provide an improved manual control for a machine tool in which an improved servo valve having a follow-up system is employed.

A further object is to provide an improved hydraulic control apparatus for machine tools in which a machine cycle is completed automatically upon initiation by the operator, or the automatic control may readily be rendered ineffective and a manual servo valve apparatus utilized for controlling the machine operation.

A further object is to provide an improved servo valve mechanism for the hydraulic control of machine tools.

Other objects will appear from the following description, reference being had to the accompanying drawings, in which:

Fig. 1 is a front elevation of a machine incorporating the invention;

Fig. 2 is a side elevational view thereof;

Fig. 10 is a view similar to Fig. 6, showing the parts in the position assumed during the feed forward traverse of a tapping cycle;

Fig. 11 is a view similar to Fig. 6, showing the positions of the parts during the reverse feed portion of the stroke of a tapping cycle;

Fig. 12 is a schematic wiring diagram of the electrical controls;

Fig. 13 is a longitudinal sectional view of the pilot control valve and associated parts;

Figure 3:
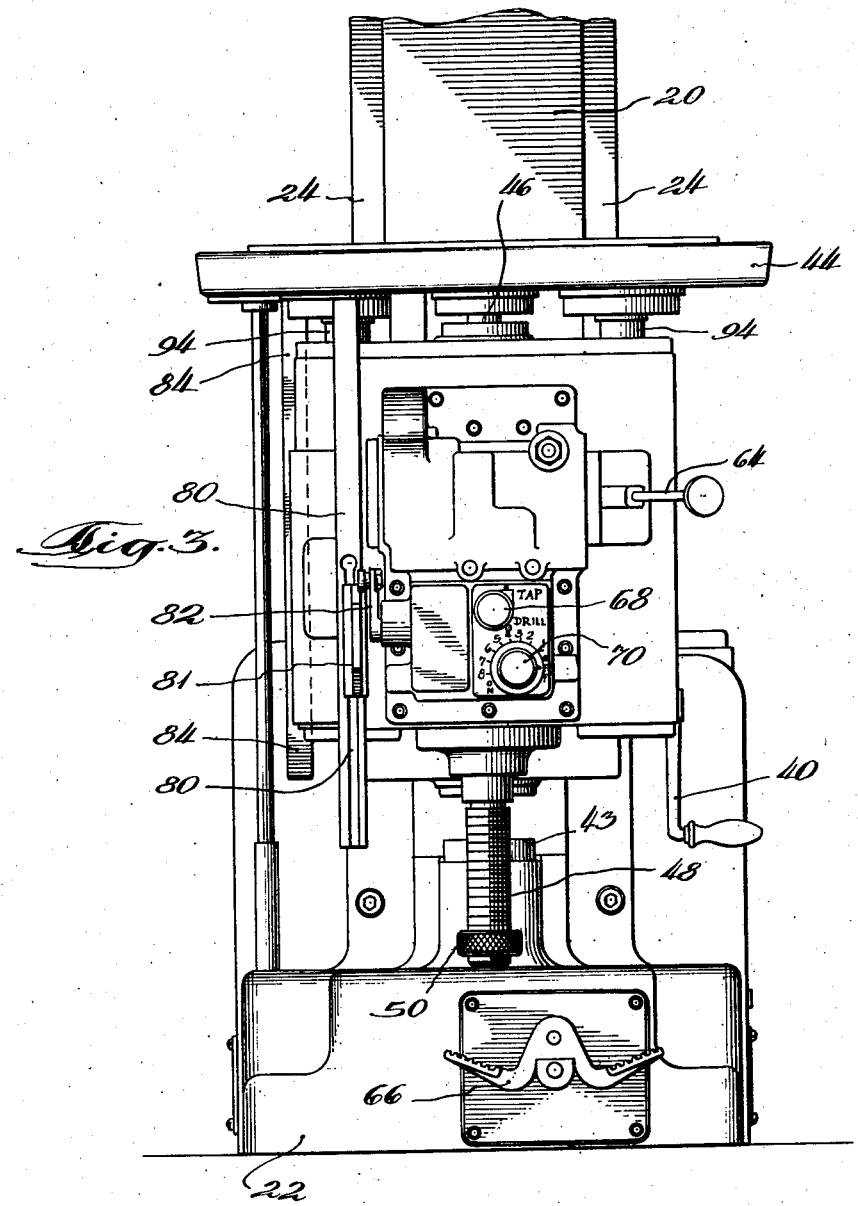
Fig. 3 is a front elevational view of the lower portion of the machine tool to an enlarged scale.
Figure 4:
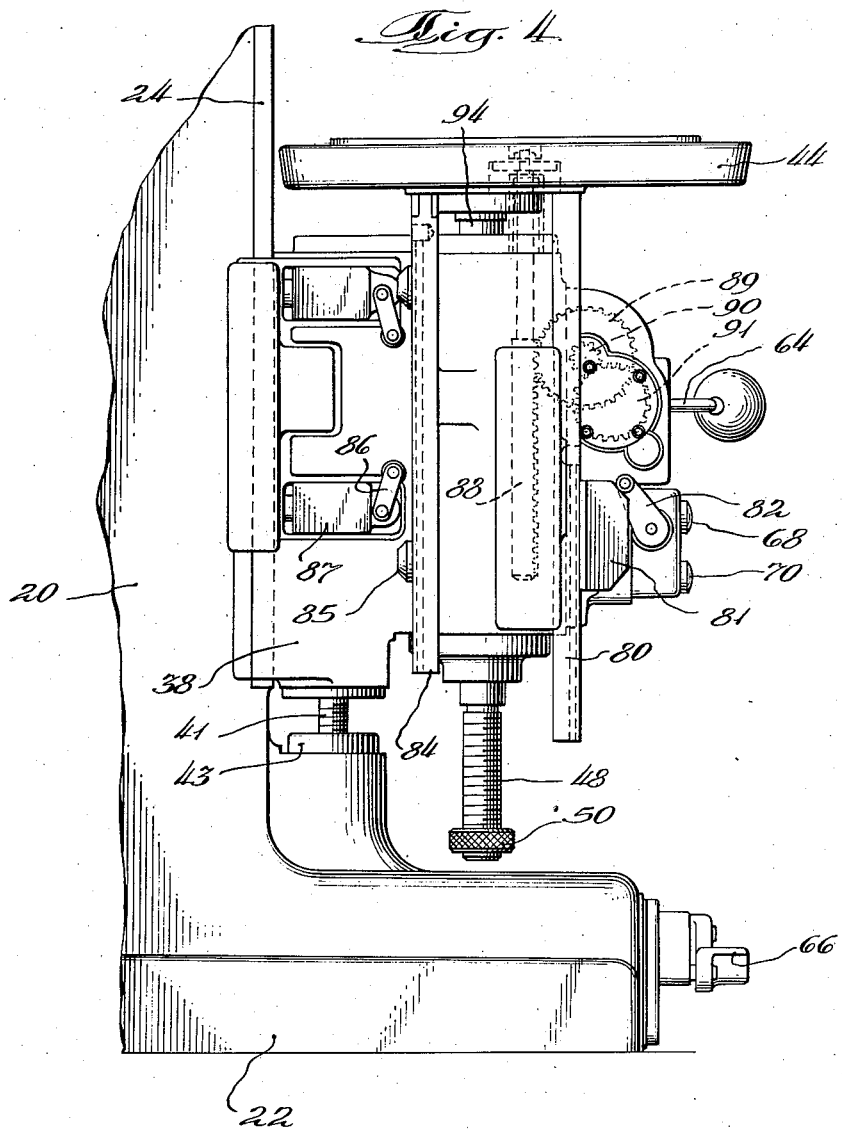
Fig. 4 is a left-side elevational view of the knee portion of the machine.
Figure 5:
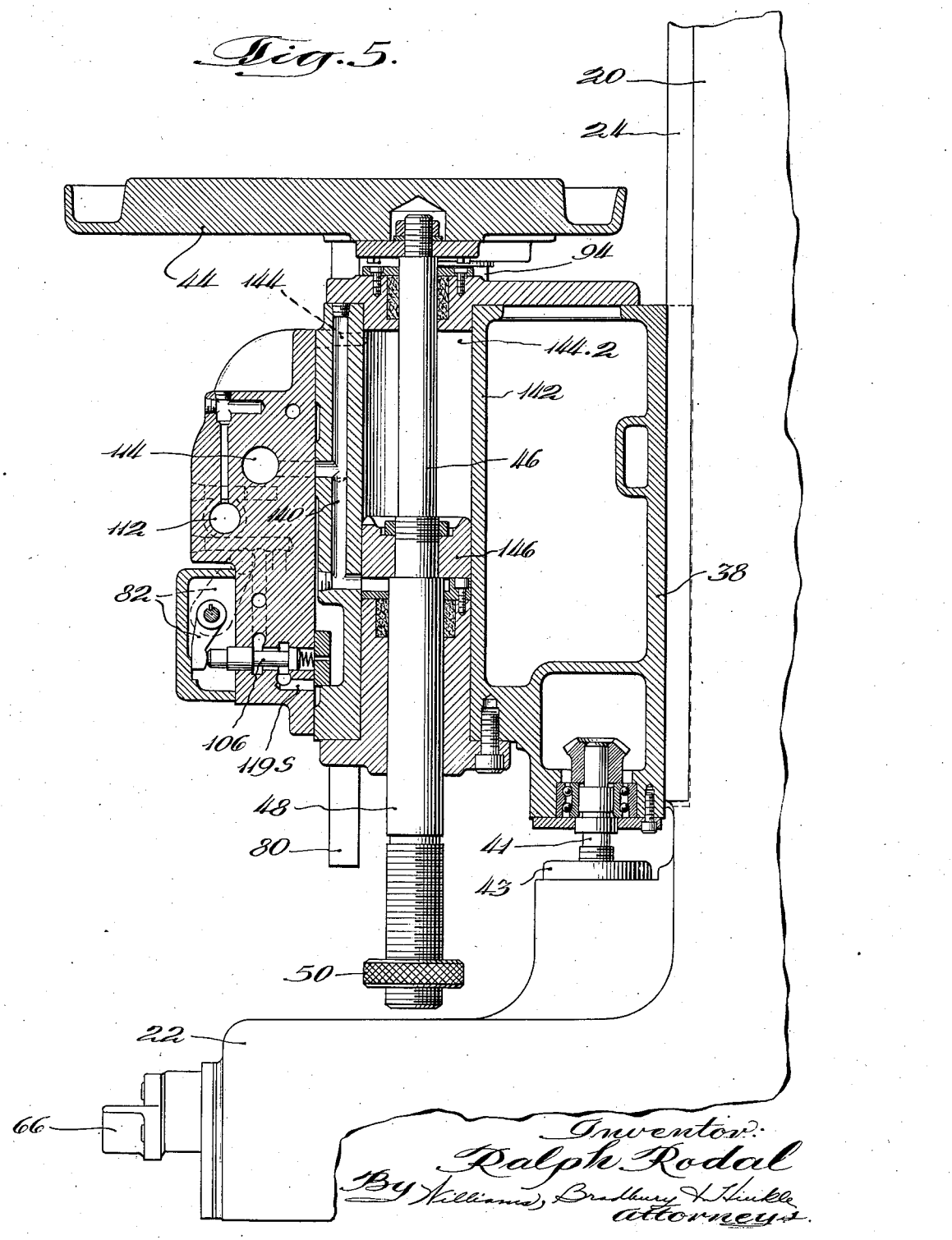
Fig. 5 is a central vertical sectional view of the knee portion of the machine taken on the line 5—5 of Fig. 1.

Figs. 14 and 15 are traverse sectional views, to an enlarged scale, taken on the lines 14—14 and 14—15 respectively of Fig. 13; and Fig. 16 is a left-hand end elevational view of the valve shown in Fig. 13, drawn to an enlarged scale.

General description

The invention is illustrated as applied to a light sensitive multiple spindle drilling and tapping machine. As shown in Figs. 1 to 5, a vertical column 20 is mounted upon or formed integrally with a base 22 and provided with ways 24. Mounted at the top of the column 20 is a gear chest 26 provided with a tool-driving motor 28 and a spindle skirt 30. On the lower plate of the latter are secured adjustable spindle arms 32 for adjustably positioning spindles 34 (only one shown) which carry the cutting tools, such as the twist drill 36.

A counterweight balanced knee 38 is slidable upon the ways 24, being elevated and lowered manually by means of a crank 40 operating through suitable gearing and an elevating screw 41 which is threaded in a suitable nut element 43 secured in the base 22. A work table 44 is supported by the upper end of a piston rod 46, the lower end 48 of the rod being threaded and provided with an adjustable positive stop nut 50.

Hydraulic and electrical control mechanism, hereinafter to be described, is provided for raising and lowering the work table 44 with respect to the knee 38. This hydraulic mechanism is supplied with a suitable hydraulic pressure fluid, such as oil, by a pump unit 52 driven by a pump motor 54. The pump unit 52 is located in a reservoir housing 55 containing a drain or sump S, and is preferably of the tandem type including a high pressure small volume pump and a low pressure large volume pump provided with suitable relief and transfer valves so as to be capable of utilizing the output of both pumps when, as in rapid traverse portions of the cycle, it is desired to have large volume delivery at relatively low pressure, and to utilize only the high pressure pump when, as, for example, during the feeding portion of the cycle, a relatively small volumetric rate at high pressure is required. The output of the pump unit is suitably connected by a flexible conduit 58 with the hydraulic control valves mounted within the knee 38, and suitable provision is made for the return to the sump 55 of the oil discharged from these hydraulic controls.

Various manual controls and adjusting levers are provided, including: A gear shifter lever 60 for determining the speed of rotation of the drills or taps; gear shifter shafts 62 for controlling the operation of individual spindles; a manual servo valve lever or handle 64 for manual control of the elevation and lowering of the work table; a foot switch lever 66, which, when tilted to the right, may be used to initiate the forward (upward) portion of an automatic cycle of operation, and which, when tilted to the left, causes emergency reverse (downward) movement of the work table; a "tap-drill" selector valve knob 68, by which the character of the automatic operating cycle, whether drilling or tapping, may be determined; a feed rate adjusting valve knob 70, by which the rate of upward feed during an automatic drilling cycle, and both upward and downward feed during an automatic tapping cycle, are controlled; a "start" push button 72; a "stop" push button 74; and in such instances as the machine is designed to be used for step drilling and through drilling, a "step-through drill" push button 76. Various elements of the electrical control system are mounted within a cabinet 78 secured at the rear of the vertical column 20.

Rigidly secured to the table 44 is a feed dog bracket 80 (Fig. 4), to which a dog 81 is secured in adjusted position for cooperation with a feed valve lever 82. A reverse dog bracket 84 is likewise secured to the table 44 for the support of an adjustable dog 85 cooperable with a reverse lever 86, by which a reverse or limit switch 87 is operated.

A rack 88 is secured to the table 44 and through a train of gearing, including gear 89, pinion 90, and gear 91, drives a servo valve sleeve 92 (Fig. 13).

A pair of guide rods 94 (Fig. 3) are rigidly secured to the table 44 and extend through suitable guide bearings formed in the knee 38.

Figure 6:
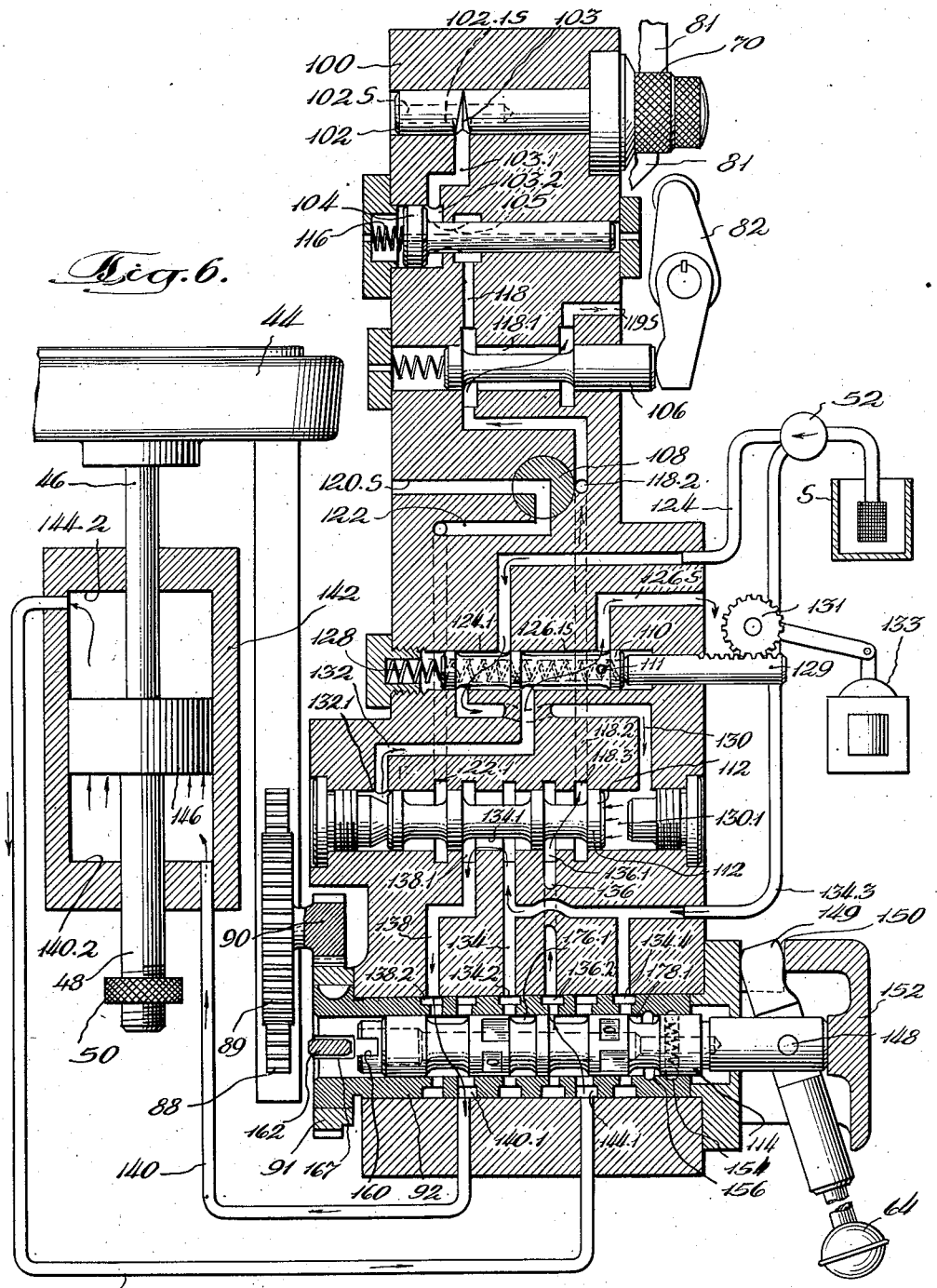
Fig. 6 is a schematic diagram of the complete hydraulic system showing the parts thereof in the position assumed during a rapid forward traverse of a drilling operation.

The hydraulic control valves are illustrated diagrammatically in Figs. 6 to 12 as being mounted in a valve body 100, and, as shown in Fig. 6, comprise a feed adjusting valve 102, a pressure governing valve 104, a feed valve 106, a tap-drill selector valve 108, a spool valve 110, a directional valve 112, and a manual servo valve 114, which cooperates with its follower sleeve 92.

Components of hydraulic controls

The feed adjusting valve 102 has a bore 102S leading to the sump. (A reference character followed by the letter S indicates in each case that the passageway is at all times in free communication with the sump.) The passageway 102S communicates through a port 102.1S with a tapering groove 103. The hydraulic fluid, oil, flows to the feed adjusting valve 102 through a duct 103.1, which communicates with the discharge chamber 103.2 of the governor valve 104. The governor valve is normally urged to the right (Fig. 6) by a compression coil spring 116 and is moved to the left by the oil pressure, thereby controlling the effective size of an aperture 105 formed therein. The governor valve thus maintains the pressure in the chamber 103.2 substantially constant so that the feed adjusting valve 102 will be capable of metering the oil flow accurately.

Oil may flow to the governing valve 104 through a passageway 118, which communicates, through the feed valve cylinder 118.1, with a passageway 118.2, the latter intersecting the bore for the tap-drill selector valve 108. The passageway 118.2 terminates in a groove 118.3 surrounding the directional valve 112. When the feed valve 106 is in the position shown in Fig. 6, its cylinder 118.1 is in communication with the sump through a duct 118S.

Figure 8:
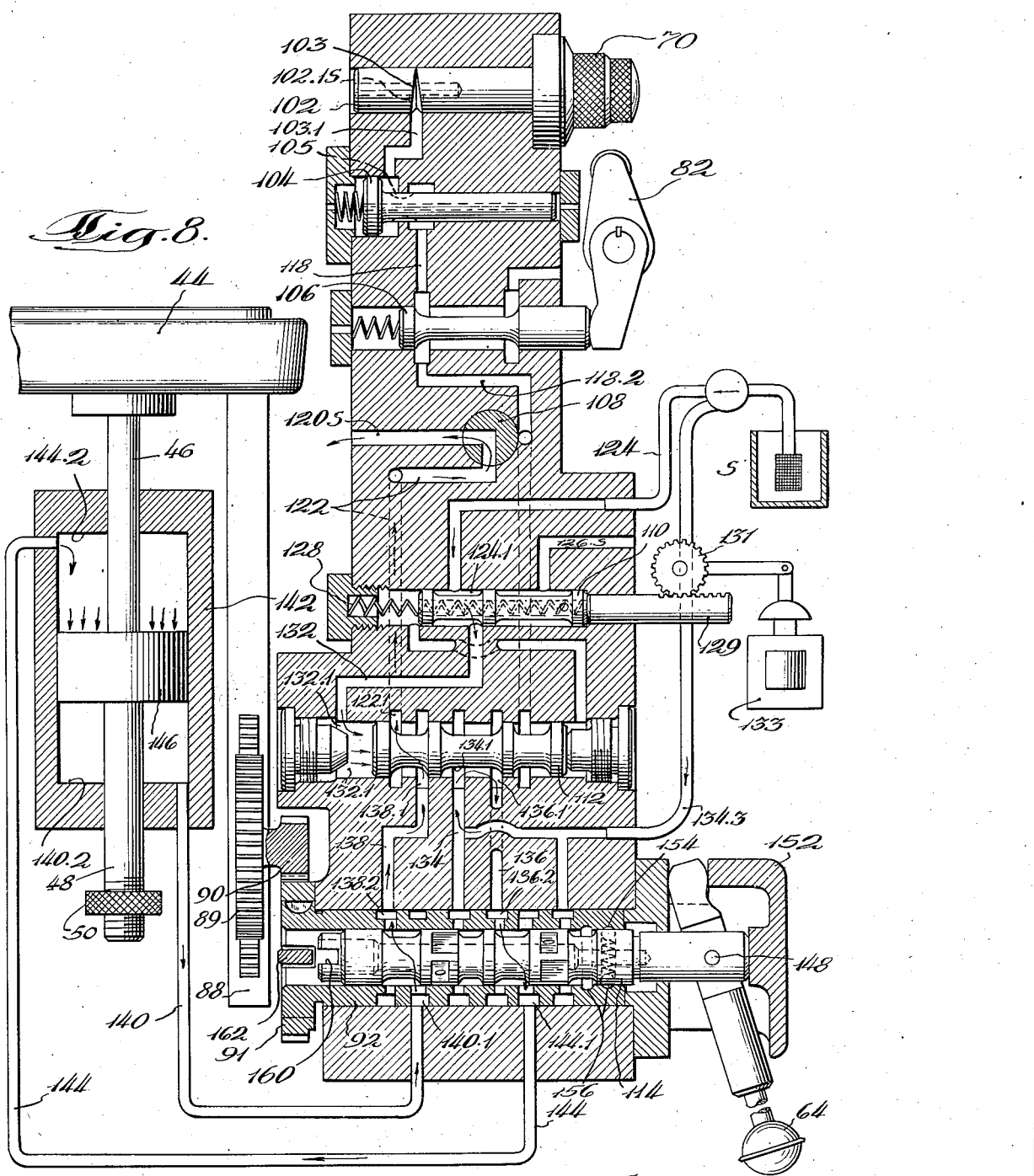
Fig. 8 is a view similar to Fig. 6, showing the parts in position for the rapid reverse traverse of a drilling cycle.

The tap-drill selector valve 108, when in the position shown, connects a passageway 120S with a duct 122, and when in its other position (90° counterclockwise from the position shown) connects the passageway 118.2 with the passageway 122. The passageway 122 leads to a groove 122.1 surrounding the directional valve 112 (Figs. 6 and 8).

The discharge from the pump 52 is supplied through a conduit 124 which leads to an annulus 124.1 surrounding a portion of the spool valve 110. A passageway 126S leads to the sump from the annular space 126.1S surrounding the spool valve 110. The spool valve 110 is normally urged to the right (Fig. 6) by a compression coil spring 128, and is operable by a rack 129 meshing with a pinion 131. The pinion 131 is adapted to be rotated clockwise upon energization of a solenoid 133. When the spool valve 110 is in the position shown in Fig. 6, the annulus 124.1 is in communication with a duct 130 leading to the space 130.1 at the right-hand end of the cylinder for the directional valve 112, while the annulus 126.1S communicates through a duct 132 with a space 132.1 at the left-hand end of the cylinder for the directional valve 112. When the solenoid 133 is deenergized, and the valve 110 moved to the right, these connections are reversed, since the valve 110 has its bore communicating with the space 126.1S through a port 111 (Fig. 6).

A passageway 134 connects annular groove 134.1 surrounding directional valve 112 with an annular groove 134.2 formed in the sleeve 92, the passageway 134 being connected to the pump 52 by a conduit 134.3. A passageway 136 connects a groove 136.1 of the directional valve with a groove 136.2 formed in the external surface of the sleeve 92.

A duct 138 connects an annular groove 138.1 around the directional valve 112 with an annular groove 138.2 formed around the sleeve 92. A conduit 140 connects a groove 140.1 around the sleeve 92 with the space 140.2 at the lower end of actuating cylinder 142, while a conduit 144 connects a groove 144.1 around the sleeve 92 with the upper end 144.2 of the cylinder 142.

The upper end of the piston rod 46, to which the piston 146 is secured, is of smaller diameter than the lower end portion thereof, for a purpose which will hereinafter be apparent.

The servo valve lever 64 is pivoted to the end of the servo valve 114 by a pin 148 and has an end portion 149 forming a fulcrum pivot in a slot 150 formed in a guide 152. The valve 114 may thus be moved longitudinally or rotated relative to its sleeve 92. The valve 114 is held in the longitudinal position to which it may be adjusted by a pair of spring-pressed detent balls 154 cooperable in either of a pair of grooves 156 formed within the sleeve 92.

The servo valve 114 has an axially drilled hole 158S (Figs. 13 to 16) and is provided with an open end slot 160 cooperable with an equalizer blade 162 when the servo valve 114 is moved to the left (Fig. 13). The equalizer blade 162 fits in slots 167 milled in the end of sleeve 92.

As best shown in Fig. 16, the equalizer blade, and hence also the servo valve 114—when the latter is in its inner or operative position—are held in predetermined angular position with respect to the sleeve 92 by four spring-pressed pins 164. Each of the pins 164 has a head 166 which rests against a shoulder 168, being pressed thereagainst by a compression spring 170, the outer end of which is seated in a hollow set screw 172. Thus, the extent of rotary movement of the servo valve 114 with respect to its sleeve 92 is limited by the equalizer blade 162, and when the servo valve handle 64 is released, the servo valve will be rotated with respect to its sleeve 92 to its normal position, as shown in Figs. 13 and 16.

The servo valve 114 has a transverse drilled hole 174S communicating with chambers 174.1 formed by flat surfaces milled across the external surface of the valve. A second drilled hole 175S similarly communicates with passageway 175.1 formed by milled flats. At positions spaced 90° with respect to the spaces 174.1 are passageways 176 formed by flats on the valve 114, these spaces communicating with an annular space 176.1, which is normally in communication with the annular groove 134.2. Similarly, there are passageways 178 spaced 90° with reference to the passageways 175.1 and communicating with annular groove 178.1, which latter is normally in communication with the groove 134.4 around the sleeve 92. The equalizer blade 162 is held in position by a wall 179 forming part of the valve housing.

Electrical control circuits

The electrical system is illustrated in the diagram of Fig. 12 as being supplied with three phase current from a suitable source through a manually operated main switch 190 connected to line conductors L1, L2, and L3. The conductors L1, L2, and L3 lead to the starting box 192 for the pump motor 54 and to the starting box 194 for the tool driving motor 28. The control circuits comprise a switch 196 operated by the "stop" push button 74 and a switch 198 operated by the "start" push button 72. The "stop" switch 196, which is normally closed, connects line conductor L3 with a conductor 199. The "start" switch 198 is adapted to connect this conductor 199 with a conductor 200. A relay device 202 has one end of its winding connected to the conductor 200 and the other end thereof connected to a return conductor 204, which returns to line L1 through overload switches 206, 207, and 208, which open in the usual manner upon an overload upon the tool driving motor 28 in the forward or reverse direction or due to an overload upon the pump motor 54.

Energization of the relay 202, in addition to initiating the operation of the pump starting mechanism 192, closes a switch 209, which establishes a holding circuit between conductors 199 and 200, thus permitting release of the "start" push button 72.

The forward and reverse treadle 66 is adapted to operate a forward switch 210, which normally connects the conductor 200 with a conductor 212 and causes the switch to complete a circuit between the conductor 200 and a conductor 214. The conductor 214 connects through the limit switch 87 with a relay winding CR2 and with the winding of the solenoid 133 through a conductor 216. The other terminals of the winding of relay CR2 and of the solenoid 133 are connected to the line conductor L1.

When the forward-reverse treadle 66 is swung counterclockwise (as when it is desired to reverse the direction of the travel of the table in an emergency), a normally closed reverse switch 218 is opened, disconnecting a conductor 220 from the conductor 200.

The relay CR2, when energized, opens a switch 222 and closes a switch 223, the latter being adapted to make connection between the conductors 220 and 214, while the switch 222 is adapted to make connection between a conductor 212 and a conductor 224.

When the tap-drill selector knob 68 is in "drill" position, a switch 226 is closed and a switch 228 open, while when this knob 68 is turned to tap position, the switch 228 is closed, and the switch 226 is open. The switch 226, when closed, connects the conductor 200 with a conductor 230, the latter leading to the winding of a "forward" relay 232 forming part of the actuating mechanism for the starting box 194 of the tool driving motor 28.

When the switch 228 is closed, a circuit is completed from the conductor 200 through the winding of a relay CR1 to the line L1. When the relay CR1 is energized, it closes switches 234 and 235, the switch 234, when closed, connecting the conductor 224 with a "reverse" relay 236 forming part of the starting box 194 of the tool driving motor 28. The switch 235, when closed, establishes a connection between conductors 216 and 230.

Operation through a drilling cycle

Assuming that the work has been set up on the table 44 and the tools properly set relative thereto, a drilling operation is commenced by pressing the "start" push button 72, temporarily closing the switch 198 (Fig. 12) and thus energizing relay 202 to close switch 209 and establish a holding circuit which connects the conductor 200 to line L3 through the "stop" switch 196. The energization of the relay 202 also causes the starting box 192 to operate to start the pump motor 54, thereby supplying the hydraulic actuating fluid (oil) to the hydraulic system. Since the switch 226 is closed, the relay 232 will be energized through the conductor 230 and cause the tool driving motor 28 to rotate in a forward direction.

The operator then steps on the right-hand portion of the treadle switch actuator 66, swinging the latter clockwise, and moving the "forward" switch 210 downwardly (Fig. 12) to connect the conductor 214 to the conductor 200 for a short interval of time. During this interval, the relay CR2 is energized through the circuit including the limit switch 87, thereby to open switch 222 and close switch 223. Closure of the switch 223 establishes a holding circuit for the relay CR2 through the "reverse" switch 218, conductor 220, switch 223, conductor 214, limit switch 87, control relay CR2, and line conductor L1. Opening the switch 22 does not have any effect at this time except to prevent possible energization of the "reverse" relay 236 due to inadvertent movement of the tap-drill knob 68 to "tap" position.

The completion of the circuit to the conductor 214 also results in energization of the "forward" solenoid 133, which, as shown in Fig. 6, moves the rack 129 inwardly (to the left), whereby the oil pressure in conduit 124 flows past the spool valve annulus 124.1 into conduit 130, to the space 130.1 at the right-hand end of the cylinder for the directional valve 112, moving the latter to the left, as shown in Fig. 6. When in this position, oil under pressure may flow through the conduit 134.3, passageway 134, annular space 134.1, annular groove 138.1, passageway 138, annular groove 138.2 in the sleeve of the servo valve, and hence around the latter to the annular groove 140.1 and conduit 140 to the lower end 140.2 of the actuating cylinder 142, forcing the piston 146 and hence the table 44 upwardly. The oil above the piston 146 escapes through conduit 144 to the groove 144.1 around the servo valve sleeve 92, across the servo valve to groove 136.2, through passageway 136, across the directional valve 112 to groove 118.3, and hence through passageway 118.2 to the annular space 118.1 around the feed valve 106, to the passageway 119S.

Figure 7:
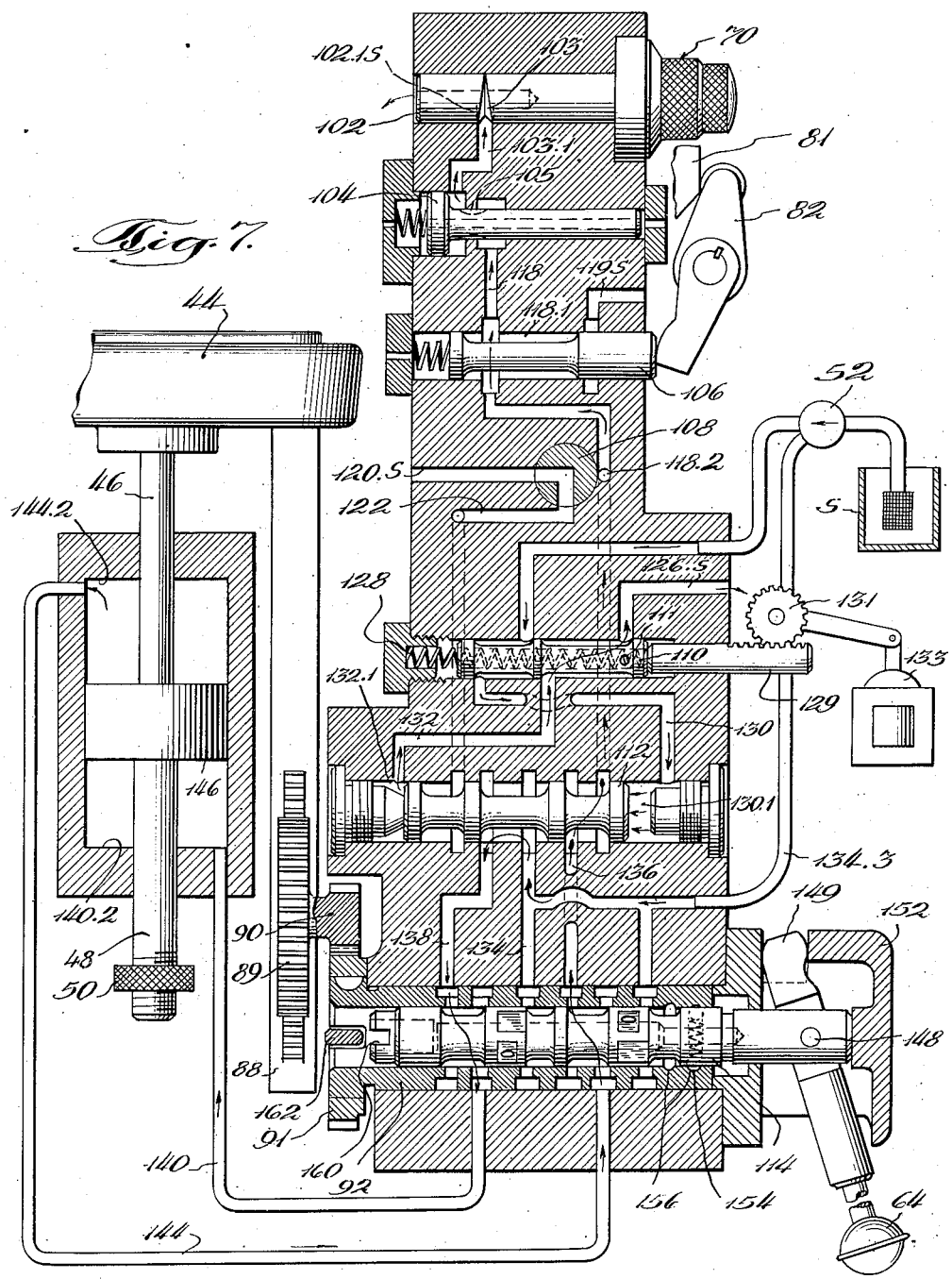
Fig. 7 is a view similar to Fig. 6, showing the parts in the position for the forward feed of a drilling operation.

It will be noted that the flow of oil from the upper end of the actuating cylinder is unrestricted and the table will thus be elevated rapidly to the position at which the tools are about to engage the work pieces. When the table arrives at this position, the feed dog 81 engages the roller on the feed valve lever 82 and the latter presses the feed valve 106 inwardly to the position in which it is shown in Fig. 7.

Under these circumstances, the supply of oil to the lower end of the cylinder is through the same hydraulic circuit as previously described, but the oil forced from the top of the actuating cylinder 142 can no longer escape to the sump through the passageway 119S, but instead, must flow through the passageway 118, through the restricted passageway 105 in the governor valve 104, and hence through passageway 103.1 through the flow metering groove 103 of the feed adjusting valve 102 to the sump. The setting of the valve 102 is such as to secure the proper feed rate for the particular machining operation to be performed. The hydraulic circuit during the feeding portion of the cycle is indicated by the arrows in Fig. 7.

When the table has been elevated to the position at which the tools have completed their operations upon the work, the dog 85 (Fig. 4) engages the roller at the end of the limit switch arm 86, and opens the limit switch 87 (Fig. 12). Opening of the switch 87 results in deenergization of the relay CR2 and the solenoid 133. Deenergization of the control relay CR2 results in opening the switch 223 which was in the holding circuit for this relay so that upon subsequent closure of the limit switch 87, the relay CR2 will not be reenergized.

Deenergization of the solenoid 133 permits spring 128 to expand and move the spool valve 110 to the right, as shown in Figs. 8 and 12. Under these conditions, oil under pressure supplied through the conduit 124 flows through the space 124.1 around the spool valve to the passageway 132, and hence to the space 132.1 at the left-hand end of the cylinder for the directional valve 112, moving the latter to the right to the position shown in Fig. 8. With the directional valve 112 in this position, oil under pressure may flow from the conduit 134.3 to the passageway 134, around the space 134.1 of the directional valve 112, through the annulus 136.1, passageway 136, and groove 136.2, across the servo valve 114, to the annular groove 144.1, and hence through conduit 144 to the space 144.2 at the upper end of the actuating cylinder 142. Pressure is thus exerted above the piston 146 and commences forcing the latter downwardly, the oil escaping from the lower end 140.2 of the actuating cylinder through conduit 140, annular groove 140.1, across the servo valve 114, to the groove 138.2 in the servo valve sleeve, passageway 138, to annular groove 138.1. The oil flows across the directional valve 112 to annular groove 122.1 and passageway 122, through the tap-drill selector valve 108, and is discharged to the sump through duct 120S.

Since the last described hydraulic path does not afford any appreciable restriction to the flow of oil, the reverse traverse will be at a rapid rate, and such downward movement of the table 44 will continue until the piston 146 strikes the bottom of the cylinder 142. The machine tool is then in condition for a second cycle of operation.

*Operation through a tapping cycle*

Figure 9:
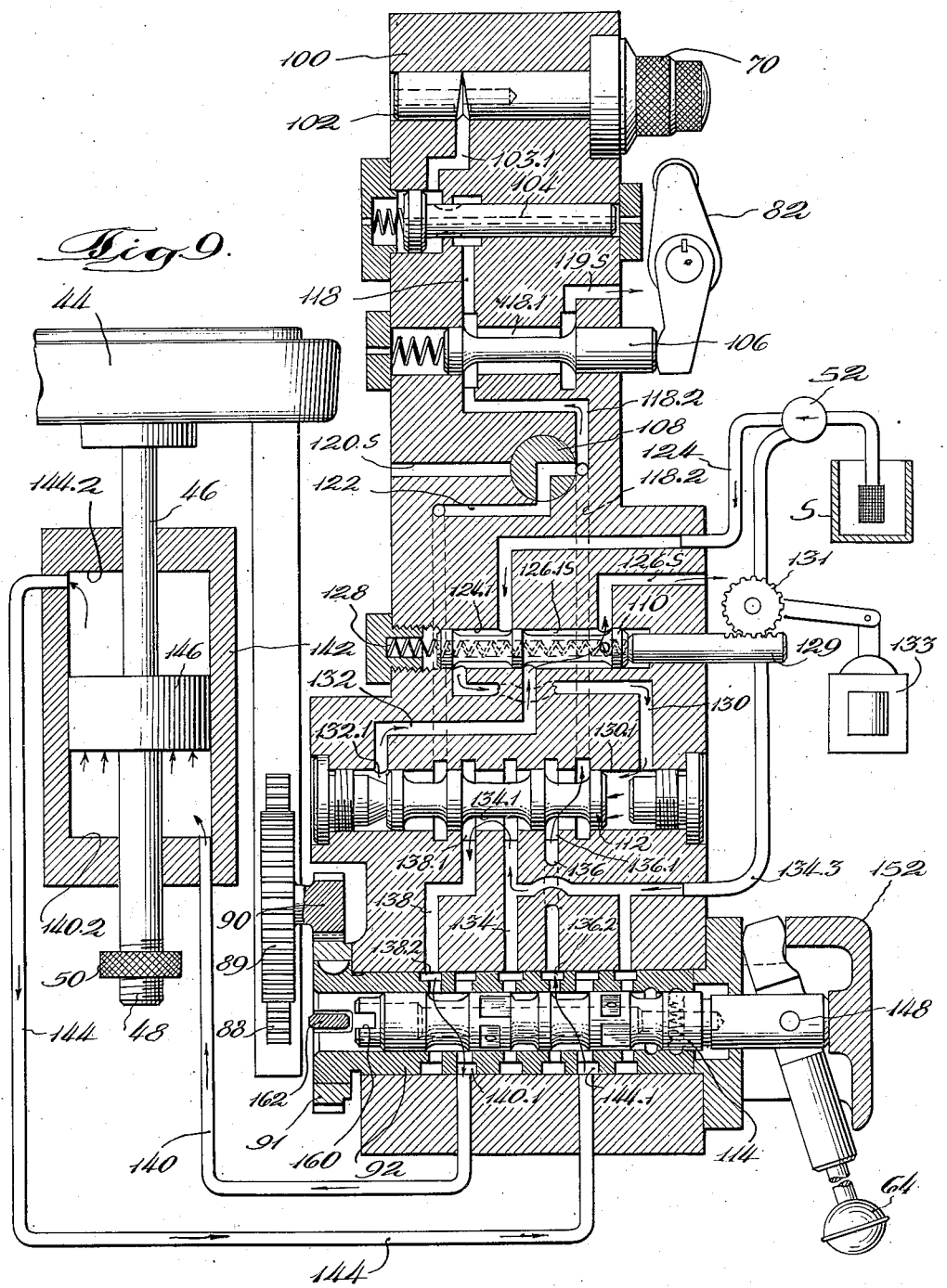
Fig. 9 is a view similar to Fig. 6 showing the parts in the position assumed during a rapid forward traverse of a tapping cycle.

When the machine is to perform a tapping operation, the tap-drill knob 68 is moved to "tap" position, thereby rotating the tap-drill valve 108 to the position in which it is shown in Fig. 9, closing switch 228 (Fig. 12) and opening switch 226. Closure of the switch 228 results in energization of the relay CR1, which is connected between the switch 228 and line L1. Opening of the switch 226 results in opening of the circuit by which the "forward" relay 232 of the tool driving motor starter 194 was formerly completed. The closure of the switch 234 by the relay CR1 results in energization of the "reverse" relay 236 of the starting mechanism 194.

Upon stepping upon the right-side of the treadle 66, the "forward" switch 210 is moved from full-line to dotted-line position, thereby completing the circuit through relay CR2 and forward solenoid 133, as previously decribed. A holding circuit for the relay CR2 is established, and at the same time, the "reverse" relay 236 of the starting mechanism 194 is deenergized by the opening of a switch 222. Instead, the "forward" relay of the starting mechanism 194 is again energized through a circuit traced as follows: From conductor 200 through switch 210, limit switch 87, conductor 216, switch 235, conductor 230, relay 232, and through conductor 204 to line L1.

Energization of the solenoid 133 results in shifting the spool valve 110 to the left (Fig. 9) against the force of its spring 128, whereupon, oil will flow from the pump 52 through conduit 124 to the annular space 124.1 around the spool valve 110, and hence through passageway 130 to the space 130.1 at the right-hand end of the directional valve 112, the oil in the space 132.1 at the other end of the spool valve being discharged through the passageway 132 and space 126.1S to the sump, all as indicated by the arrows.

Oil under pressure in the conduit 134.3 may then flow through the passageway 134 and an annular space 134.1 around the directional valve through the annular groove 138.1 and passageway 138 to annular groove 138.2 and hence across the servo valve 114 through annular groove 140.1 and conduit 140 to the space 140.2 at the bottom of the actuating cylinder 142, exerting a pressure upon the lower face of the piston 146 and causing upward movement thereof. The oil in the space 144.2 at the upper end of the actuating cylinder is discharged through conduit 144 to annular groove 144.1 across servo valve 114 to annular groove 136.2 and passageway 136 to annular groove 136.1. The oil continues flowing around the directional valve to passageway 118.2 through the space 118.1 around the feed valve 106 and hence through the passageway 119S to the sump.

After the table has thus raised the work to position for engagement by the taps, the dog 81 engages the roller of the feed valve lever 82 and the latter presses the feed valve 106 inwardly to cut off communication between the space 118.1 and the passageway 119S. This condition is illustrated in Fig. 10, in which the hydraulic flow is from the pump 52 through the conduit 124 and through the valve mechanism, as previously described with reference to Fig. 9, to the lower end 140.2 of the actuating cylinder. The oil from the upper end 144.2 of the cylinder 142 is, however, discharged at a controlled rate, since the valve 106 has cut off the free discharge of the oil from the space 118.1 to the passageway 119S and instead, the oil must flow through the duct 118, around the governor valve 104, through the passageway 103.1 and through the feed adjusting metering valve 102.

The taps are of the floating type, that is, the tool spindles are arranged to slide longitudinally relative to their driving shafts, being resiliently held in their uppermost position. The feed adjusting valve 102 is adjusted to a position such that the rate of upward feed of the table is somewhat slower than the rate at which the taps cut into the work. Thus, during the upward feed of the work, the taps are drawn downwardly by virtue of the fact that the tapping tools are feeding themselves into the work at a slightly faster rate than the work is being moved upwardly.

When the work piece has been tapped to proper depth, as determined by the positioning of the dog 85, the "reverse" limit switch 87 is opened, thereby deenergizing control relay CR2 and "forward" solenoid 133, as well as the "forward" relay 232. Deenergization of the relay CR2 results in closure of switch 222 which, since switches 234 and 210 are closed, results in the energization of the "reverse" relay 236. Consequently, the tool driving motor 28 is first stopped and then started in reverse direction.

The parts will then be in the position shown in Fig. 11. The solenoid 133 being deenergized, the spool valve 110 is moved to the right-most position by its spring 128 and the hydraulic fluid supplied by the pump 52 is thus forced from the conduit 124 through the space 124.1 around the spool valve, through the passageway 132, to the space 132.1 at the left-hand end of the directional valve 112, thus forcing the latter to the right. The oil in its space 130.1 at the other end of the directional valve 112 flows through the passageway 130 and through the bore of the spool valve 110 and ports 111 to the passageway 126S, as indicated by the arrows.

With the directional valve 112 in its right-most position, oil under pressure flows from the conduit 134.3, passageway 134, through the space 134.1 around the directional valve, annular groove 136.1 passageway 136, annular groove 136.2, around the servo valve 114, annular groove 144.1, conduit 144, to the upper end 144.2 of actuating cylinder 142, causing downward movement of the table. The oil in the lower end 140.2 of the cylinder 142 flows through conduit 140, across the servo valve 114, to passageway 138, past the directional valve 112 from groove 138.1 to groove 122.1, passageway 122, through the tap-drill selector valve 108, to passageway 118.2, through the feed valve space 118.1 and duct 118, through the governor valve 104, and hence through the feed adjusting valve 102.

Since the position of the feed adjusting valve is not changed during a tapping cycle, the rate of discharge of oil during the downward feed of the table will be the same as during the upward feed. However, due to the fact that the portion of the piston rod 46 above the piston is of lesser diameter than the portion below the piston, there will be a lesser volume of oil displaced by the piston rod per inch of downward feed than was displaced during the upward feed of the table. Thus, the downward feed will be more rapid than the upward feed and will be at substantially the rate at which the taps feed themselves out of the work piece. Thus, the taps may "float" during the downward feed of the table as well as during the upward feed.

When the table reaches the position at which the taps have been completely disengaged from the work, the feed valve dog 81 permits the feed valve lever 82 to return to normal, whereupon, the feed valve 106 is forced outwardly by its spring and the oil from the lower end 140.2 of the actuating cylinder 142, instead of being forced through the governor valve 104 and feed adjusting valve 102, may escape through the passageway 119S, thereby permitting the rapid traverse of the table to its lowermost position, in which position it is arrested by engagement of the piston 146 with the lower end of the cylinder 142.

In both the drilling and tapping operations, the stop nut 50 is adjusted on the lower end of the piston rod 46 so as to limit the upward movement of the table and prevent damage should the limit switch, and the parts controlled thereby, fail to operate with sufficient rapidity.

*Operation using servo valve*

Whenever it is desired to drill or tap using a manual control, or whenever it is desired to move the table to a different position, as when setting up the machine and making adjustments in the positions of the dogs, the movement of the table may be controlled by means of the servo valve lever 64. To render the servo valve operative, the lever is swung to the left to cause engagement of its slot 160 with the equalizing blade 162, as shown in Fig. 13. When the servo valve 114 is in this position, it will be noted that the lands thereof completely block flow from the grooves 138.2 and 136.2 and when the valve is in central rotary position, communication to the grooves 140.1 and 144.1 is also blocked. The space 176 is, however, in communication with the pressure side of the pump through conduit 134.3, passageway 134, and groove 134.2, while the space 178 is similarly in communication with the pressure side of the pump through conduit 134.3 and groove 134.4.

Thereafter, the table may be elevated by swinging the servo valve lever 64 upwardly and may be lowered by swinging this lever downwardly.

When the valve lever 64 is swung upwardly, the spaces 176 come into registry with the ports 140.3 leading to groove 140.1 (Fig. 14), and thus a path for flow of oil from the groove 134.2 to the groove 140.1 is established and oil may flow to the lower end 140.2 of the actuating cylinder 142. At the same time, the spaces 175.1 come into registry with the ports 144.3 leading to groove 144.1, and thus establish a path for the flow of oil from the conduit 144, and hence from the space 144.2 at the upper end of the actuating cylinder 142, to the drilled holes 175S, from whence the oil may flow through the bore 158S to the sump.

Thus, oil under pressure is applied to the lower face of the piston 146 and oil permitted to escape to the sump from above the piston, and the piston and table move upwardly. The rate at which this flow takes place depends upon how quickly the lever 64 is swung upwardly. However, as the table moves upwardly, the rack 88 moves with it, and thus rotates the gear 89 and pinion 90 clockwise (Figs. 14 to 16), and consequently, rotates the pinion 91 and servo valve sleeve 92 counterclockwise. Assuming that the operator held the servo valve handle 64 stationary, such counterclockwise movement of the sleeve 92 results in the servo valve 114 and its sleeve 92 again resumes the relative positions in which they are shown in Figs. 14 and 15. In this position, the spaces 176 and 178, as well as the spaces 174.1 and 175.1 are cut off from communication with the ports leading to the grooves 140.1 and 144.1, and hence there can be no oil flow to or from the actuating cylinder 142.

Conversely, when the servo valve lever 64 is swung downwardly to move the servo valve 114 clockwise (Figs. 14 to 16), the spaces 178 are brought into communication with the ports of the groove 174, while the spaces 174.1 are brought into communication with the ports leading to the groove 140.1. As a result, oil under pressure flows through the spaces 178 into the conduit 144 and from the conduit 140 through the spaces 174.1, ports 174S, and bore 158S, to the sump. Thus, the piston 46 and table 44 are moved downwardly, which, through the rack and pinion drive, causes rotation of the servo valve sleeve 92 in a clockwise direction. Such motion of the table continues until the servo valve 114 and its sleeve 92 again attain the relative positions in which they are shown in Figs. 14 to 16, at which time, the flow to and from the actuating cylinder 142 is cut off.

Relative rotation between the servo valve 114 and its sleeve 92 is limited because of the engagement of the servo valve with the equalizer blade 162, the latter being resiliently held in a central position in the slot 167 by the four spring-pressed plungers 164, and these plungers, acting through the equalizing blade, return the servo valve to neutral position relative to its sleeve 92 whenever the handle 64 is released.

When the servo valve 114 is in its operative position, and as shown in Fig. 13, it will be clear that the positions of the directional valve, the feed valve, the feed adjusting valve, and the spool valve, is immaterial, since these valves can have no effect upon the operation of the machine. Therefore, if it is desired to perform a drilling operation using the servo valve manual control, it is necessary merely to set the tap-drill control knob 68 to drill position so as to secure forward rotation of the tool driving motor 28. Thereafter, upon pressing the start button 72, the machine may be operated through a drilling cycle by merely swinging the servo valve lever 64 upwardly at an angular velocity corresponding to the desired rates of traverse and feed, and after the work piece has been drilled to the required depth, the work table may be lowered at a rapid or slow rate merely by correspondingly swinging the servo valve lever 64 downwardly until the work table is low enough to permit the pieces to clear the tools.

The servo valve lever 64 operates in the manner of a "dead man" control since whenever the lever is released, the spring-pressed plungers 164 immediately center the servo valve 114 with respect to its sleeve, thus cutting off the flow to and from the actuating cylinder 142.

Furthermore, the rate of upward and downward travel of the table 44 will be controlled by the degree of force manually applied to the servo valve lever 64. The table may be elevated and lowered by means of the servo valve as easily and with as exacting, if not more exacting, control than if the table were substantially weightless and it were being moved by hand.

The servo valve control is of particular utility when the machine tool is used to machine pieces mounted in tumble or sliding fixtures. In such cases, the start or length of the feeding portion of the cycle may differ, and it therefore results in a considerable saving in time to be able to control the machine by means of the servo valve.

If at any time during the automatic operation of the machine through a drilling or a tapping cycle it should become desirable to stop the operation and lower the work piece away from the tools, it is merely necessary for the operator to step upon the left-hand end of the treadle 66, whereupon, the reverse switch 218 will be opened, thus opening the holding circuit for the relay CR2. Opening this circuit results in deenergization of the forward solenoid 133 so as to shift the spool valve 110 to the right, thereby shifting the directional valve 112 to the right and causing flow of the oil under pressure into the upper end of the cylinder 142 and permitting flow from the lower end of this cylinder, either directly to the sump in the event that the tap-drill knob 68 is in drill position, or to the sump through the feed adjusting valve 102 if the tap-drill knob 68 is set for a tapping operation and if the dog 81 is in position holding the feed valve 106 in its left-most position.

While I have shown and described a particular embodiment of my invention, it will be apparent to those skilled in the art that the invention may be embodied in many other forms. I therefore desire, by the following claims, to include within the scope of my invention, all such modifications and variations by which substantially the same results may be obtained through the use of substantially the same or equivalent means.

I claim:

1. In a control apparatus for a machine tool having a member moved back and forth to cause operating engagement and disengagement of the work and tools, the combination of a hydraulic motor for moving said member, control means including hydraulic passageways leading to said motor and operable to cause the machine tool to execute an automatic operating cycle, a servo valve and sleeve which when in one position relative to each other have ports forming parts of said passageways and which when in another position control the flow of hydraulic fluid from said source to said motor and control the discharge of hydraulic fluid from said motor, a single handle for relatively shifting said servo valve from one of said positions to the other and for operating the servo valve to control the flow of hydraulic fluid to and from said motor, and a positive kinematic driving connection between said member and said sleeve.

2. In a control apparatus for a machine tool having a member moved back and forth to cause operating engagement and disengagement of the work and tools, the combination of a hydraulic motor for moving said member, control means including hydraulic passageways leading to said motor and operable to cause the machine tool to execute an automatic operating cycle, a servo valve and sleeve which when in a first position relative to each other have ports forming parts of said passageways and which when in a second position control the flow of hydraulic fluid from said source to said motor and control the discharge of hydraulic fluid from said motor, a single handle for relatively shifting said servo valve from one of said positions to the other and for operating the servo valve to control the flow of hydraulic fluid to and from said motor, resilient means operative between said servo valve and said sleeve to move said valve to closed position, and a positive driving connection between said member and said sleeve.

3. The combination set forth in claim 2 in which said resilient means is rendered effective only when said valve and sleeve are in said second position.

4. A servo valve structure for manually controlling the position of a hydraulically operated part, comprising, a valve body, a ported sleeve rotatable in said body and having its angular position controlled by the hydraulically operated part, a longitudinally movable two-position valve having ports which in one position of the valve are cooperable with the ports in said sleeve to control the flow of hydraulic actuating fluid to and from said hydraulically operated part, and which in another position is ineffective to control such flow, and manually operable means to shift said valve between its two positions and to determine its angular position with respect to said sleeve.

5. In a control apparatus for a machine tool having a member moved back and forth to cause operating engagement and disengagement of the work and tools, the combination of a hydraulic motor for moving said member, control means including hydraulic passageways leading to said motor and operable to cause the machine tool to execute an automatic operating cycle, a servo valve and sleeve which when in one position longitudinally relative to each other have ports forming parts of said passageways and which when in another position control the flow of hydraulic fluid from said source to said motor and control the discharge of hydraulic fluid from said motor, and a single handle for relatively shifting said servo valve from one of said positions to the other and for operating the servo valve to control the flow of hydraulic fluid to and from said motor.

6. In a servo valve mechanism for the hydraulic control of a machine tool in which the machine tool comprises a hydraulic motor having a moving part, the combination of a valve body having a bore, a ported sleeve mounted for rotation in said bore, a positive driving connection between said machine tool part and said sleeve to cause rotary motion of the latter proportional to the extent of movement of the former, a valve element rotatable within said sleeve and operable with said sleeve to control the flow through the ports thereof to and from said motor, said valve having a transverse slot at one end thereof, a handle operatively connected to said valve for rotating the latter with respect to said sleeve, means comprising an equalizing blade extending through said slot and mounted for limited movement in said sleeve, said means limiting the extent of relative rotary motion of said valve and sleeve, and resilient means opposing relative rotation of said valve and sleeve from a position intermediate those determined by said motion limiting means.

7. In a servo valve mechanism for the hydraulic control of a machine tool in which the machine tool comprises a hydraulic motor having a moving part, the combination of a valve body having a bore, a ported sleeve mounted for rotation in said bore, a positive driving connection between said machine tool part and said sleeve to cause rotary motion of the latter proportional to the extent of movement of the former, a valve element rotatable and longitudinally reciprocable within said sleeve and operable with said sleeve to control the flow through the ports thereof to and from said motor, a handle, an operating connection between said handle and said valve for rotating and reciprocating the latter with respect to said sleeve, means to limit the extent of relative rotary motion between said valve and said sleeve, and means to limit the extent of reciprocatory motion of said valve.

8. The combination set forth in claim 7, in which said means limiting rotary motion between said sleeve and said valve comprises a resiliently mounted element engaging said valve and said sleeve only when said valve is in a predetermined position longitudinally with respect to said sleeve, said element being operable to move said valve to a predetermined position with respect to said sleeve whenever no external torque is applied to said valve.

9. The combination set forth in claim 7, in which said valve and said sleeve each have diametral slots formed therein and in which said motion limiting means comprises an equalizer blade located in said slots, and resilient means are provided to hold said blade centrally in one of said slots.

10. The combination set forth in claim 7, in which said rotary motion limiting means is rendered effective by longitudinal movement of said valve to one position and rendered ineffective by longitudinal movement of said valve to another position.

RALPH RODAL.